(12) United States Patent
Virtej et al.

(10) Patent No.: US 9,414,313 B2
(45) Date of Patent: Aug. 9, 2016

(54) DISCONTINUOUS RECEPTION (DRX) FOR DIVERSE TRAFFIC

(71) Applicant: Nokia Technologies Oy, Espoo (FI)

(72) Inventors: Elena Virtej, Espoo (FI); Jari Petteri Lunden, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/434,555

(22) PCT Filed: Nov. 16, 2012

(86) PCT No.: PCT/IB2012/002382
§ 371 (c)(1),
(2) Date: Apr. 9, 2015

(87) PCT Pub. No.: WO2014/076516
PCT Pub. Date: May 22, 2014

(65) Prior Publication Data
US 2015/0264645 A1    Sep. 17, 2015

(51) Int. Cl.
*H04W 52/02* (2009.01)
*H04W 76/04* (2009.01)
*H04W 72/04* (2009.01)
*H04W 76/06* (2009.01)

(52) U.S. Cl.
CPC ........ *H04W 52/0216* (2013.01); *H04W 72/042* (2013.01); *H04W 76/048* (2013.01); *H04W 76/068* (2013.01)

(58) Field of Classification Search
CPC .......... H04W 52/0216; H04W 72/042; H04W 76/068; H04W 76/048
See application file for complete search history.

(56) References Cited

U.S. PATENT DOCUMENTS

| 8,085,694 | B2 | 12/2011 | Wu et al. | |
| 8,675,585 | B2* | 3/2014 | Park | H04W 76/048 370/329 |
| 2007/0291728 | A1* | 12/2007 | Dalsgaard | H04L 12/12 370/347 |
| 2008/0186892 | A1* | 8/2008 | Damnjanovic | H04W 52/0216 370/311 |
| 2009/0232054 | A1* | 9/2009 | Wang | H04W 52/0225 370/328 |
| 2010/0110897 | A1 | 5/2010 | Chun et al. | |
| 2010/0120378 | A1* | 5/2010 | Harada | H04W 76/048 455/88 |
| 2010/0135231 | A1* | 6/2010 | Harada | H04W 52/0225 370/329 |

(Continued)

FOREIGN PATENT DOCUMENTS

WO    2013035984 A1    3/2013

OTHER PUBLICATIONS

International Search Report and Written Opinion received for corresponding Patent Cooperation Treaty Application No. PCT/IB2012/002382, dated Aug. 20, 2013, 13 pages.

*Primary Examiner* — Ajay Cattungal
(74) *Attorney, Agent, or Firm* — Nokia Technologies Oy

(57) ABSTRACT

Methods, apparatuses, and computer program products for discontinuous reception (DRX) are provided. One method may include configuring a user equipment with a first inactivity timer and a second inactivity timer. The user equipment may be further configured, after decoding a physical downlink control channel (PDCCH) indicating a new data transmission, to start the first inactivity timer for a first N times of active time, and to start the second inactivity timer for times subsequent to the first N times. If a short DRX cycle is configured, expiry of the first inactivity timer does not start a short discontinuous reception (DRX) cycle, while expiry of the second inactivity timer starts the short discontinuous reception (DRX) cycle.

15 Claims, 3 Drawing Sheets

(56) References Cited

U.S. PATENT DOCUMENTS

| | | | | |
|---|---|---|---|---|
| 2011/0026625 A1* | 2/2011 | Susitaival | H04W 52/0251 | 375/260 |
| 2011/0199910 A1* | 8/2011 | Oh | H04W 52/0229 | 370/241 |
| 2011/0237231 A1* | 9/2011 | Horneman | H04W 76/048 | 455/414.1 |
| 2011/0237266 A1* | 9/2011 | Cai | H04W 76/048 | 455/450 |
| 2012/0120843 A1 | 5/2012 | Anderson et al. | | |
| 2012/0188903 A1* | 7/2012 | Futaki | H04W 52/0232 | 370/252 |
| 2013/0155928 A1* | 6/2013 | Yu | H04W 52/0216 | 370/311 |
| 2013/0242953 A1* | 9/2013 | Malkamaki | H04W 76/048 | 370/336 |
| 2013/0258919 A1* | 10/2013 | Damnjanovic | H04W 52/0209 | 370/311 |
| 2013/0301421 A1* | 11/2013 | Yi | H04W 52/0216 | 370/241 |
| 2014/0204820 A1* | 7/2014 | Wittberg | H04M 1/271 | 370/311 |
| 2014/0247742 A1* | 9/2014 | Lee | H04W 52/0216 | 370/252 |
| 2015/0163740 A1* | 6/2015 | Lee | H04W 76/048 | 370/311 |
| 2015/0181571 A1* | 6/2015 | Park | H04W 52/0216 | 370/252 |
| 2015/0208461 A1* | 7/2015 | Lee | H04W 76/048 | 370/311 |

* cited by examiner

DISCONTINUOUS RECEPTION (DRX) FOR DIVERSE TRAFFIC

RELATED APPLICATION

This application was originally filed as Patent Cooperation Treaty Application No. PCT/IB2012/002382 filed Nov. 16, 2012.

BACKGROUND

1. Field

Embodiments of the invention generally relate to wireless communication systems, such as, but not limited to, the Universal Mobile Telecommunications System (UMTS) Terrestrial Radio Access Network (UTRAN), Long Term Evolution (LTE) Evolved UTRAN (E-UTRAN), and/or LTE-Advanced (LTE-A). Some embodiments relate to discontinuous reception (DRX) in such systems.

2. Description of the Related Art

Universal Mobile Telecommunications System (UMTS) Terrestrial Radio Access Network (UTRAN) refers to a communications network including base stations, or Node Bs, and for example radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS). In case of E-UTRAN (enhanced UTRAN) no RNC exists and most of the RNC functionalities are contained in the eNodeB (evolved Node B, also called E-UTRAN Node B).

Long Term Evolution (LTE) or E-UTRAN refers to improvements of the UMTS through improved efficiency and services, lower costs, and use of new spectrum opportunities. In particular, LTE is a 3rd generation partnership project (3GPP) standard that provides for uplink peak rates of at least 50 megabits per second (Mbps) and downlink peak rates of at least 100 Mbps. LTE supports scalable carrier bandwidths from 20 MHz down to 1.4 MHz and supports both Frequency Division Duplexing (FDD) and Time Division Duplexing (TDD). Advantages of LTE are, for example, high throughput, low latency, FDD and TDD support in the same platform, an improved end-user experience, and a simple architecture resulting in low operating costs.

Further releases of 3GPP LTE (e.g., LTE Rel-11, LTE-Rel-12) are targeted towards future international mobile telecommunications advanced (IMT-A) systems, referred to herein for convenience simply as LTE-Advanced (LTE-A). LTE-A is directed toward extending and optimizing the 3GPP LTE radio access technologies. A goal of LTE-A is to provide significantly enhanced services by means of higher data rates and lower latency with reduced cost. LTE-A will be a more optimized radio system fulfilling the international telecommunication union-radio (ITU-R) requirements for IMT-Advanced while keeping the backward compatibility.

SUMMARY

One embodiment includes a method for discontinuous reception (DRX). The method may include configuring a user equipment with at least a first inactivity timer and a second inactivity timer. The user equipment may be further configured, after decoding a physical downlink control channel (PDCCH) indicating a new data transmission, to start the first inactivity timer for a first N times of active time, and to start the second inactivity timer for times subsequent to the first N times. If a short DRX cycle is configured, expiry of the first inactivity timer may not start the short DRX cycle, while expiry of the second inactivity timer starts the short DRX cycle.

Another embodiment includes an apparatus. The apparatus includes at least one processor, and at least one memory including computer program code. The at least one memory and computer program code, with the at least one processor, cause the apparatus at least to configure a user equipment with at least a first inactivity timer and a second inactivity timer, and to configure the user equipment, after decoding a physical downlink control channel (PDCCH) indicating a new data transmission, to start the first inactivity timer for a first N times of active time, and to start the second inactivity timer for times subsequent to the first N times. Expiry of the first inactivity timer may not start a short discontinuous reception (DRX) cycle, and expiry of the second inactivity timer starts the short discontinuous reception (DRX) cycle.

Another embodiment is directed to a computer program embodied on a non-transitory computer readable medium. The computer program is configured to control a processor to perform a process. The process includes configuring a user equipment with at least a first inactivity timer and a second inactivity timer, and configuring the user equipment, after decoding a physical downlink control channel (PDCCH) indicating a new data transmission, to start the first inactivity timer for a first N times of active time, and to start the second inactivity timer for times subsequent to the first N times. Expiry of the first inactivity timer may not start a short discontinuous reception (DRX) cycle, and expiry of the second inactivity timer starts the short discontinuous reception (DRX) cycle.

Another embodiment is directed to an apparatus including means for configuring a user equipment with at least a first inactivity timer and a second inactivity timer. The apparatus may also include means for configuring the user equipment, after decoding a physical downlink control channel (PDCCH) indicating a new data transmission, to start the first inactivity timer for a first N times of active time, and to start the second inactivity timer for times subsequent to the first N times. Expiry of the first inactivity timer may not start a short discontinuous reception (DRX) cycle, while expiry of the second inactivity timer starts the short discontinuous reception (DRX) cycle.

Another embodiment is directed to a method that includes starting, by a user equipment configured with at least a first inactivity timer and a second inactivity timer, the first inactivity timer for a first N new data transmissions to the user equipment. The method further includes starting the second inactivity timer for times subsequent to the first N times. Expiry of the first inactivity timer may not start a short discontinuous reception (DRX) cycle, and expiry of the second inactivity timer starts the short discontinuous reception (DRX) cycle.

Another embodiment includes an apparatus. The apparatus includes at least one processor, and at least one memory including computer program code. The apparatus is configured with at least a first inactivity timer and a second inactivity timer. The at least one memory and computer program code, with the at least one processor, cause the apparatus at least to start the first inactivity timer for a first N new data transmissions to the apparatus, and to start the second inactivity timer for times subsequent to the first N times. Expiry of the first inactivity timer does not start a short discontinuous reception (DRX) cycle, and expiry of the second inactivity timer starts the short discontinuous reception (DRX) cycle.

Another embodiment is directed to a computer program embodied on a non-transitory computer readable medium.

The computer program is configured to control a processor to perform a process. The process includes starting, by a user equipment configured with at least a first inactivity timer and a second inactivity timer, the first inactivity timer for a first N new data transmissions to the user equipment. The process further includes starting the second inactivity timer for times subsequent to the first N times. Expiry of the first inactivity timer does not start a short discontinuous reception (DRX) cycle, and expiry of the second inactivity timer starts the short discontinuous reception (DRX) cycle.

Another embodiment is directed to an apparatus including means for starting, by a user equipment configured with at least a first inactivity timer and a second inactivity timer, the first inactivity timer for a first N new data transmissions to the user equipment. The apparatus further includes means for starting the second inactivity timer for times subsequent to the first N times. Expiry of the first inactivity timer does not start a short discontinuous reception (DRX) cycle, and expiry of the second inactivity timer starts the short discontinuous reception (DRX) cycle.

BRIEF DESCRIPTION OF THE DRAWINGS

For proper understanding of the invention, reference should be made to the accompanying drawings, wherein.

DETAILED DESCRIPTION

Figure 1:
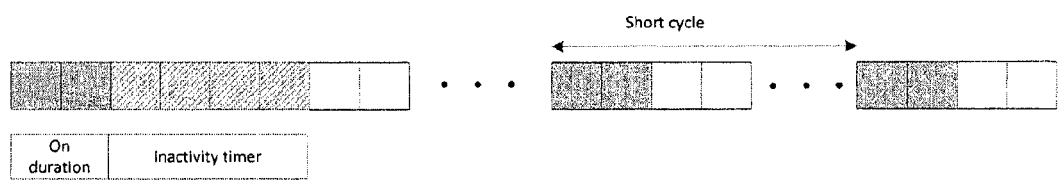
FIG. 1 illustrates an example of the DRX functionality.

It will be readily understood that the components of the invention, as generally described and illustrated in the figures herein, may be arranged and designed in a wide variety of different configurations. Thus, the following detailed description of embodiments of the invention, as represented in the attached figures, is not intended to limit the scope of the invention, but is merely representative of selected embodiments of the invention.

If desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

Certain embodiments of the invention relate to E-UTRAN and, in some embodiments, relate to E-UTRAN UE power consumption, enhancements for diverse data application (eDDA), UE scheduling and physical downlink control channel (PDCCH) monitoring. The early phases of the E-UTRAN specification (see 3GPP TS 36.331, 3GPP TS 36.321, and 3GPP TS 36.133) took UE power consumption in radio resource control (RRC) connected mode into account by defining the RRC connected mode discontinuous reception (DRX) scheme. This RRC connected mode DRX scheme enables the UE to achieve significant power savings when the RRC connected mode DRX feature is used and configured by the evolved Node-B (eNB) and/or network.

A UE may be configured by RRC with a DRX functionality that controls the UE's PDCCH monitoring activity. When in RRC_CONNECTED mode, if DRX is configured, the UE can monitor the PDCCH discontinuously using the DRX operation described below. Otherwise, the UE may monitor the PDCCH continuously. As an example, RRC may control DRX operation by configuring timers, such as the onDurationTimer, drx-FirstInactivityTimer, drx-InactivityTimer, drx-RetransmissionTimer, the longDRX-Cycle, the value of the drxStartOffset and, optionally, the drxShortCycleTimer and shortDRX-Cycle. It should be noted that the drx-FirstInactivityTimer may be denoted by other names or labels. The meaning of the drx-FirstInactivityTimer and drx-InactivityTimer should be understood as an example of how to specify use of two different length inactivity timers, when the current 3GPP TS 36.321 V11.0.0 (2012-09) specifies one inactivity timer (drx-InactivityTimer). In addition, the names (e.g. onDurationTimer, drx-FirstInactivityTimer, drx-InactivityTimer, drx-RetransmissionTimer, longDRX-Cycle, drxStartOffset, drxShortCycleTimer, shortDRX-Cycle) are just descriptive according to 3GPP LTE specifications, but similarly discontinuous reception and embodiments of this invention may be applied to other systems as well.

Some embodiments may relate to the LTE Rel-12 further enhancements for diverse data applications (feDDA) work item (WI), which has an objective of, in the context of providing improved always-on connectivity, identifying and specifying mechanisms at the RAN level that enhance the ability of LTE to handle diverse traffic profiles and small data packets. Accordingly, one embodiment provides an enhancement to the existing DRX functionality that improves a UE's power efficiency when having, for example, traffic comprised mainly of small data packets and occasional larger data bursts. Some embodiments may relate also to other releases of 3GPP LTE or other radio access technologies or systems. The names of the timers or periods may differ, but the methods disclosed in this invention can be applied, possibly with other names, in other systems as well.

User equipment, such as smart phones, can typically have applications running in the background and generating traffic even when the user is not interacting with the device. At other times, the user is using the device more actively and creating more traffic. In combination, this creates a very diverse and bursty traffic profile. This may be characterized, for instance, by periods of larger data traffic followed by a long silence period, or traffic comprising small data packets followed by long/short silence periods. LTE provides DRX as a method for saving power. As suggested above, DRX allows a UE to save power by refraining from monitoring for the PDCCH all the time. The time instances when the UE will monitor for PDCCH is dictated by specification defining DRX functionality, the configuration by the network, and the transmissions by the network to the UE (because reception of those will affect the timers controlling DRX).

FIG. 1 illustrates an example of the DRX functionality. In this example, the UE monitors the PDCCH during the On Duration. If the PDCCH is successfully decoded and indicates a new data transmission, the inactivity timer is started and the UE will continue to monitor the PDCCH until the inactivity timer expires. If a short DRX cycle is configured, the UE will start the short DRX cycle after the inactivity timer expires. If the short DRX cycle is not configured, then DRX will enter in the long cycle and the UE is not required to monitor PDCCH until the On Duration in the next DRX cycle.

One problem that arises is that this mechanism does not adapt well to a typical smart phone traffic profile where there are periods of low activity with few small packets and then periods of higher activity. This is because transmitting one or few small packets will still start the inactivity timer and then the short cycle. And if the DRX is configured more conservatively (with a shorter inactivity timer or without short DRX cycle), there will be longer delays during larger data bursts if there are short interruptions within the traffic. Therefore, solutions to improve the DRX functionality in relation to small data packet traffic are needed. One of the main goals of eDDA is directed to enhancing the procedures related to UE power saving. These enhancements may also include optimizations for DRX configuration or control that might be specific to these traffic types.

Accordingly, certain embodiments of the invention address the problem of how to improve UE power saving opportunities. In particular, some embodiments may be applicable to diverse smart phone traffic comprised of occasional higher activity bursts in-between always on traffic that comprises small data packets.

When a DRX cycle is configured, the Active Time may include the time while a first inactivity timer (e.g., drx-FirstInactivityTimer or drx-InactivityTimer, but also other names may be used) is running. In one embodiment in which DRX is configured, for each subframe the UE stops the first inactivity timer when a DRX command MAC control element is received. According to an embodiment, if the first inactivity timer expires in a particular subframe, the long DRX cycle is used (i.e., the UE has opportunity for DRX/sleep until next On Duration in the Long DRX Cycle). In one embodiment, when, during the Active Time, the PDCCH indicates a new transmission (DL or UL) the first inactivity timer is started or restarted if it is the first new transmission during the current Active Time; otherwise, the first inactivity timer is stopped.

In one example embodiment, when the PDCCH indicates a new transmission (DL or UL) the first inactivity timer is started or restarted if it is the first new transmission or one of first N new transmissions during the current Long DRX cycle (i.e., since previous start of On Duration of the Long DRX cycle). Subsequent new transmissions start a second inactivity timer.

In one example embodiment, when a UE receives a DRX Command MAC control element while the first inactivity timer is running, the Long DRX cycle is used even if Short DRX cycle is configured for the UE. In another example embodiment, when a UE receives a DRX Command MAC control element when no inactivity timer is running (during On Duration), the Long DRX cycle is used even if Short DRX cycle is configured for the UE.

Therefore, according to one embodiment, the UE is configured, for example, with two inactivity timers (e.g., drx-InactivityTimer). In other embodiments, the UE may be configured with a single inactivity timer or with more than two inactivity timers. After a successful decoding of PDCCH indicating a new data transmission, for a first time, or for the first N times, of the current Active Time the first inactivity timer is started. While for the subsequent times, the second inactivity timer is started. Additionally, in an embodiment, the expiration of the first inactivity timer does not start the short cycle timer (e.g., drxShortCycleTimer). In an embodiment, the expiration of the second inactivity timer does start the short cycle timer.

In one example embodiment, the UE has only one inactivity timer, but its length (i.e. value, duration or period) depends on how many times it has been started and/or restarted during the current Active Time (or alternatively during the current Long DRX cycle). For example, this could be that the first time or for the first N times, the length is different (e.g., shorter) than in subsequent times after the first or first N times.

In some example embodiments, there is a longer time window (e.g. longer than the Long DRX cycle, e.g. 10 seconds or some other length) over which the number of times the inactivity timer is started or restarted is counted. And in successive starts and/or restarts the inactivity timer length is adapted (e.g. lengthened, or changed so that expiry of the timer does not start Short DRX cycle even if that is configured for the UE), or a different timer is used after the number of starts and/or restarts exceeds N times (e.g. 3 times in a cycle). There may be also more than two inactivity timers, e.g. so that a first inactivity timer is used for the first N times, a second inactivity timer is used for the subsequent M times and a third inactivity timer is used after N+M times.

In some example embodiments, a first inactivity timer is started/restarted for first time (or first N times) when within current Active Time, DRX cycle, or some other time window, UE receives a transmission that is specified or configured to start/restart of inactivity timer. Subsequent transmissions specified or configured to start inactivity timer start a second inactivity timer.

In some example embodiments, the switching from first inactivity timer to second inactivity timer may depends on how long the first inactivity timer has been running in total in the current Long DRX cycle or current Active Time or some other length time window, where the timer may have been started and/or restarted multiple times. If the timer has been running for longer than e.g. T subframes (e.g. 50 ms in 2 seconds).

According to some embodiments, the first inactivity timer is used only for first N times (within Active Time, DRX cycle, or some other time window) when a new DL transmission is scheduled (e.g. PDCCH indicating it is successfully decoded), and scheduling of a new UL transmission starts the second inactivity timer. In embodiments, vice versa the first inactivity timer is started only for first N UL new data transmissions, and DL new data transmissions start the second inactivity timer. In some embodiments different first and second inactivity timers for UL and DL new transmissions may be configured.

According to some embodiments, the first inactivity timer is not used for first (or first P) new UL transmissions scheduled after UE has sent a scheduling request (SR). In such case, the UE may be expecting response from the network to its communication (e.g. a HTTP request) and longer inactivity timer (or Short DRX cycle) may be useful. For the same reason, it may be preferred that second inactivity timer is always used after UL scheduling, even for the first scheduling(s).

According to some example embodiments the first inactivity timer (e.g. shorter and/or expiry not starting Short DRX cycle) may be used or configured only if UE has set Power Preference Indication (PPI) to value lowPowerConsumption. Also other means of UE indicating the network that first inactivity timer should or should not be used or configured by the network may be used, such as for example UE directly signaling the network whether it needs this feature, or e.g. use of certain Scheduling Request (SR) resource could indicate this. Or UE could signal (e.g. using a new MAC control element) that it is expecting a response to its UL transmission and thus prefers the inactivity timer to run longer and/or Short DRX cycle to run (or run longer) after the inactivity timer expires. In some embodiments, UE may signal (e.g. using a MAC control element possibly combined with a user data transmission, or a specific SR or SR resource or PPI indication for lowPowerConsumption) that it is not expecting a response to its UL transmission and thus the first inactivity timer (or no inactivity timer at all) is to be used.

According to one embodiment, the first inactivity timer is shorter than the second. Therefore, the first (or first N) transmissions to the UE during the ongoing DRX cycle cause a shorter inactivity timer (i.e., the first inactivity timer) to be started. This facilitates power efficient transmission of low data rate background traffic (e.g., keep-alive messages), while still allowing more flexible scheduling when there is more data. In some embodiments, the first inactivity timer length may even be zero, or there may be only one inactivity timer, which is configured such that the first (or first N) transmissions (within Active Time, DRX cycle, or some other time window) that would trigger starting of inactivity timer do not do so, and only in the subsequent times the inactivity timer will be started/restarted.

Figure 2:
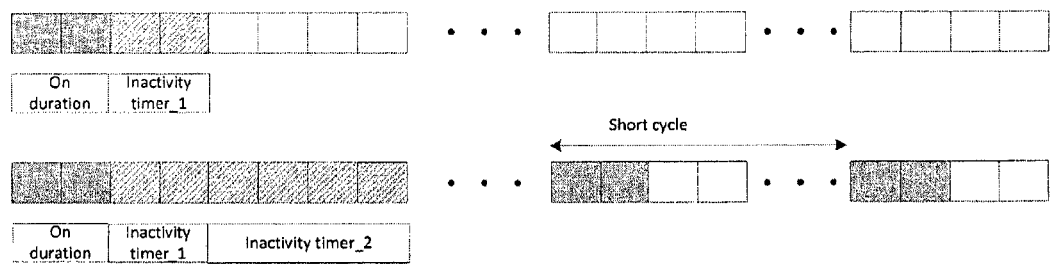
FIG. 2 illustrates an example of the DRX functionality including two inactivity timers, according to one embodiment of the invention.

FIG. 2 illustrates an example of the two inactivity timers, according to one embodiment. In the example of FIG. 2, as discussed above, the network can configure two inactivity timers: Inactivity timer_1 and Inactivity timer_2. In this embodiment, the first inactivity timer does not start the short cycle DRX, while the second inactivity timer activates the short cycle DRX.

Figure 3A:
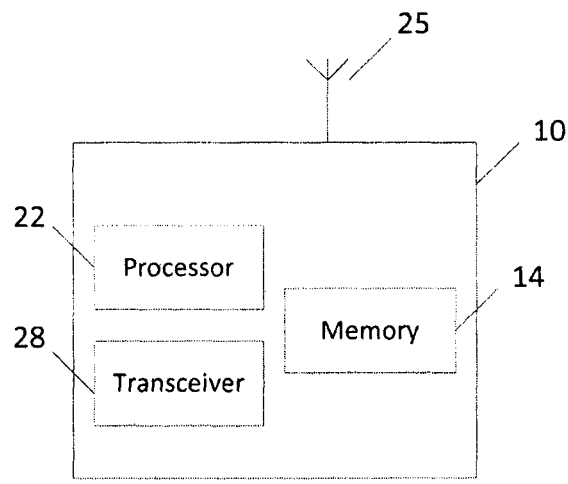
FIG. 3a illustrates an apparatus according to an embodiment.

FIG. 3a illustrates an example of an apparatus 10 according to an embodiment. In one embodiment, apparatus 10 may be a UE. It should be noted that one of ordinary skill in the art would understand that apparatus 10 may include components or features not shown in FIG. 3a. Only those components or feature necessary for illustration of the invention are depicted in FIG. 3a.

As illustrated in FIG. 3a, apparatus 10 includes a processor 22 for processing information and executing instructions or operations. Processor 22 may be any type of general or specific purpose processor. While a single processor 22 is shown in FIG. 3a, multiple processors may be utilized according to other embodiments. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 further includes a memory 14, which may be coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

Apparatus 10 may also include one or more antennas 25 for transmitting and receiving signals and/or data to and from apparatus 10. Apparatus 10 may further include a transceiver 28 configured to transmit and receive information. For instance, transceiver 28 may be configured to modulate information on to a carrier waveform for transmission by the antenna(s) 25 and demodulates information received via the antenna(s) 25 for further processing by other elements of apparatus 10. In other embodiments, transceiver 28 may be capable of transmitting and receiving signals or data directly.

Processor 22 may perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 stores software modules that provide functionality when executed by processor 22. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

As mentioned above, according to one embodiment, apparatus 10 may be a UE. In an embodiment, apparatus 10 is a UE configured by the network with a first inactivity timer and a second inactivity timer. In this embodiment, apparatus 10 may be controlled by memory 14 and processor 22, after decoding a PDCCH indicating a new data transmission, to start the first inactivity timer for the first N times of the active time, and, for subsequent times, to start the second inactivity timer. In an embodiment, the expiry of the first inactivity timer does not start the short DRX cycle, but the expiry of the second inactivity timer does start the short DRX cycle. Additionally, according to one embodiment, the first inactivity timer is shorter than the second inactivity timer.

In one embodiment, the first inactivity timer is used only for the first or first N times of the current Long DRX cycle, and after the Short DRX cycle has been started, the second inactivity timer is used until the UE returns to Long DRX cycle (after Short DRX cycle ends) and successfully decodes a PDCCH indicating new transmission during the next Long DRX cycle On Duration.

Figure 3B:
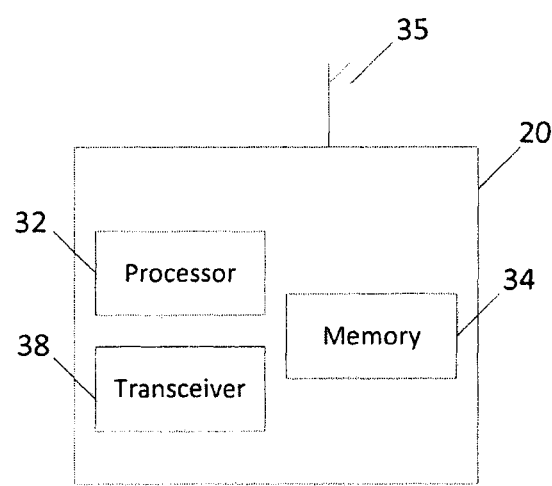
FIG. 3b illustrates an apparatus according to another embodiment.

FIG. 3b illustrates an example of an apparatus 20 according to another embodiment. In an embodiment, apparatus 20 may be a network element, such as a base station. It should be noted that one of ordinary skill in the art would understand that apparatus 20 may include components or features not shown in FIG. 3b. Only those components or feature necessary for illustration of the invention are depicted in FIG. 3b.

As illustrated in FIG. 3b, apparatus 20 includes a processor 32 for processing information and executing instructions or operations. Processor 32 may be any type of general or specific purpose processor. While a single processor 32 is shown in FIG. 3b, multiple processors may be utilized according to other embodiments. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 20 further includes a memory 34, which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 34 can be comprised of any combination of random access memory (RAM), read only memory (ROM), static storage such as a magnetic or optical disk, or any other type of non-transitory machine or computer readable media. The instructions stored in memory 34 may include program instructions or computer program code that, when executed by processor 32, enable the apparatus 20 to perform tasks as described herein.

Apparatus 20 may also include one or more antennas 35 for transmitting and receiving signals and/or data to and from apparatus 20. Apparatus 20 may further include a transceiver 38 configured to transmit and receive information. For instance, transceiver 38 may be configured to modulate information on to a carrier waveform for transmission by the antenna(s) 35 and demodulates information received via the antenna(s) 35 for further processing by other elements of apparatus 20. In other embodiments, transceiver 38 may be capable of transmitting and receiving signals or data directly.

Processor 32 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources.

In an embodiment, memory 34 stores software modules that provide functionality when executed by processor 32. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

As mentioned above, according to one embodiment, apparatus 20 may be a base station, such as an eNB. In this embodiment, apparatus 20 may be controlled by memory 34 and processor 32 to configure a UE with a first inactivity timer and a second inactivity timer. As mentioned above, after decoding a PDCCH indicating a new data transmission, the first inactivity timer is started for the first N times of the active time, and, for subsequent times, the second inactivity timer is started. According to one embodiment, the expiry of the first inactivity timer does not start the short DRX cycle, whereas the expiry of the second inactivity timer does start the short DRX cycle.

Figure 4A:
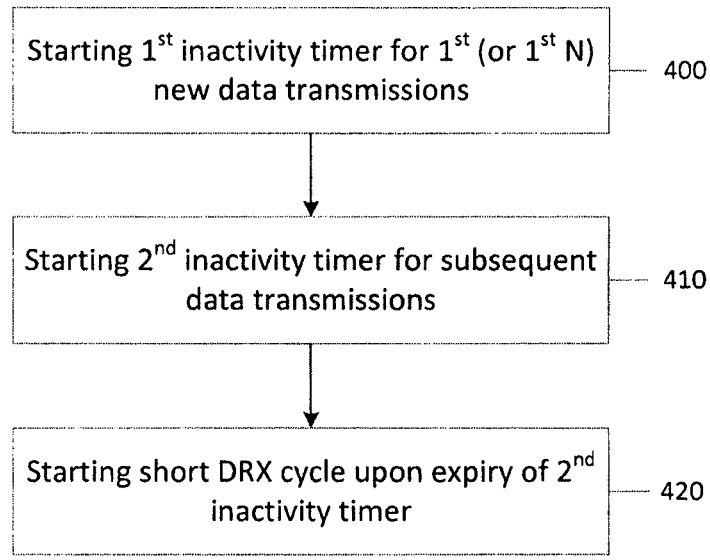
FIG. 4a illustrates a flow diagram of a method according to an embodiment.

FIG. 4a illustrates a flow diagram of a method providing improved DRX for diverse data traffic, according to one embodiment. In one example embodiment, the method illustrated in FIG. 4a may be performed by a UE configured with a first inactivity timer and a second inactivity timer. In one embodiment, the first inactivity timer is shorter than the second inactivity timer. The method of FIG. 4a may include, at 400, starting the first inactivity timer for the first, or first N, new data transmissions to the UE. The method may then include, at 410, starting the second inactivity timer for the subsequent data transmissions. According to one embodiment, the method may further include, at 420, starting the short DRX cycle upon expiry of the second inactivity timer.

Figure 4B:
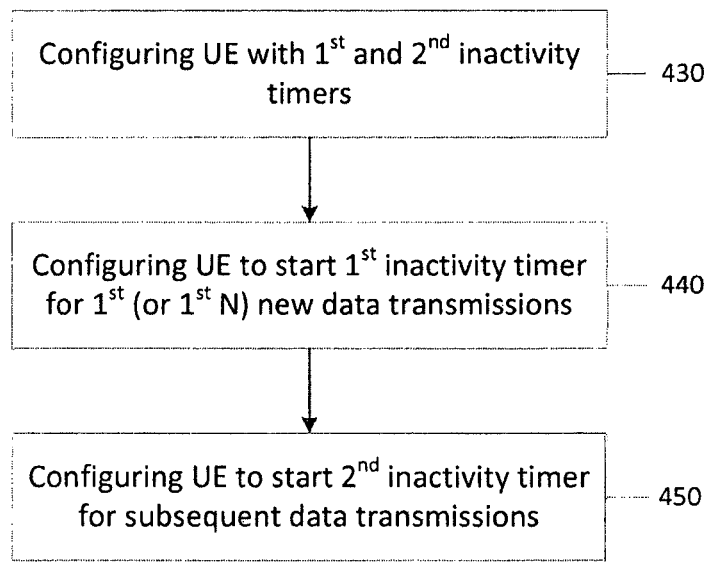
FIG. 4b illustrates a flow diagram of a method according to another embodiment.

FIG. 4b illustrates a flow diagram of a method providing improved DRX for diverse data traffic, according to another embodiment. In one example embodiment, the method illustrated in FIG. 4b may be performed by a network element, such as an eNB. The method of FIG. 4b may include, at 430, configuring a UE with a first inactivity timer and a second inactivity timer. The method may further include, at 440, configuring the UE to start the first inactivity timer for the first, or first N, new data transmissions to the UE. The method may then include, at 450, configuring the UE to start the second inactivity timer for the subsequent data transmissions. In some embodiments, one or more of the steps in FIG. 4b may be part of specified operation of the UE and thus not explicitly configured by the network.

In some embodiments, the functionality of any of the methods described herein, such as those of FIGS. 4a and 4b, may be implemented by software and/or computer program code stored in memory or other computer readable or tangible media, and executed by a processor. In other embodiments, the functionality may be performed by hardware, for example through the use of an application specific integrated circuit (ASIC), a programmable gate array (PGA), a field programmable gate array (FPGA), or any other combination of hardware and software.

In view of the above, embodiments of the invention provide two inactivity timers for the UL direction and two inactivity timers for the DL direction. Moreover, in some embodiments, the first inactivity timer is shorter and is, therefore, meant for small data packets, while the second inactivity timer is longer and is meant for more active traffic. As such, the UE may be configured with two inactivity timers such that the first inactivity timer is started after a first PDCCH indicating new data (or first few PDCCHs indicating new data) of the active time, and the second inactivity timer is started on successive activations during the same active time. In some embodiments, expiry of the first inactivity timer does not start the short DRX cycle, whereas expiry of the second inactivity timer starts the short DRX cycle.

Certain embodiments of the invention provide several advantages. For example, as a result of some embodiments, power efficiency of UEs having diverse data traffic (e.g., small data packets with occasional larger burst) can be improved. In addition, embodiments adapt well to diverse traffic profiles because the secondary longer inactivity timer (and short DRX) is used when a larger traffic burst occurs.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. An apparatus, comprising:
   at least one processor; and
   at least one memory comprising computer program code,
   the at least one memory and the computer program code configured, with the at least one processor, to cause the apparatus at least to
   configure a user equipment with a first inactivity timer and a second inactivity timer;
   configure the user equipment, after decoding a physical downlink control channel (PDCCH) indicating a new data transmission, to start the first inactivity timer for a first N times of active time, and to start the second inactivity timer for times subsequent to the first N times,
   wherein, if a short discontinuous reception (DRX) cycle is configured, expiry of the first inactivity timer does not start the short discontinuous reception (DRX) cycle, and expiry of the second inactivity timer starts the short discontinuous reception (DRX) cycle.

2. The apparatus according to claim 1, wherein the first inactivity timer is shorter than the second inactivity timer.

3. The apparatus according to claim 1, wherein N=1.

4. The apparatus according to claim 1, wherein the apparatus comprises an evolved node B (eNB).

5. A method, comprising:
starting, by a user equipment configured with a first inactivity timer and a second inactivity timer, the first inactivity timer for a first N new data transmissions to the user equipment;
starting the second inactivity timer for times subsequent to the first N times,
wherein, if a short discontinuous reception (DRX) cycle is configured, expiry of the first inactivity timer does not start the short discontinuous reception (DRX) cycle, and expiry of the second inactivity timer starts the short discontinuous reception (DRX) cycle.

6. The method according to claim 5, wherein the first inactivity timer is shorter than the second inactivity timer.

7. The method according to claim 5, wherein N=1.

8. The method according to claim 5, wherein, when the user equipment receives a discontinuous reception (DRX) command medium access control (MAC) control element while the first inactivity timer is running, using a long discontinuous reception (DRX) cycle even if the short discontinuous reception (DRX) cycle is configured for the user equipment.

9. The method according to claim 5, wherein, when the user equipment receives a discontinuous reception (DRX) command medium access control (MAC) control element when no inactivity timer is running, using the long discontinuous reception (DRX) cycle even if the short discontinuous reception (DRX) cycle is configured for the user equipment.

10. An apparatus, comprising:
at least one processor; and
at least one memory comprising computer program code, wherein the apparatus is configured with a first inactivity timer and a second inactivity timer,
the at least one memory and the computer program code configured, with the at least one processor, to cause the apparatus at least to
start the first inactivity timer for a first N new data transmissions to the apparatus;
start the second inactivity timer for times subsequent to the first N times,
wherein, if a short discontinuous reception (DRX) cycle is configured, expiry of the first inactivity timer does not start the short discontinuous reception (DRX) cycle, and expiry of the second inactivity timer starts the short discontinuous reception (DRX) cycle.

11. The apparatus according to claim 10, wherein the first inactivity timer is shorter than the second inactivity timer.

12. The apparatus according to claim 10, wherein N=1.

13. The apparatus according to claim 10, wherein the apparatus comprises a user equipment.

14. The apparatus according to claim 10, wherein, when the apparatus receives a discontinuous reception (DRX) command medium access control (MAC) control element while the first inactivity timer is running, the apparatus is configured to use a long discontinuous reception (DRX) cycle even if the short discontinuous reception (DRX) cycle is configured for the apparatus.

15. The apparatus according to claim 10, wherein, when the apparatus receives a discontinuous reception (DRX) command medium access control (MAC) control element when no inactivity timer is running, the apparatus is configured to use the long discontinuous reception (DRX) cycle even if the short discontinuous reception (DRX) cycle is configured for the user equipment.

* * * * *